(12) United States Patent
Koeppe

(10) Patent No.: US 9,639,180 B2
(45) Date of Patent: *May 2, 2017

(54) COMPUTER SYSTEM AND A CONTROL METHOD THEREFOR

(71) Applicant: ISIQIRI INTERFACE TECHNOLOGIES GmbH, Hagenberg (AT)

(72) Inventor: Robert Koeppe, Linz (AT)

(73) Assignee: ISIQIRI INTERFACE TECHNOLOGIES GMBH, Hagenberg (AT)

( * ) Notice: Subject to any disclaimer, the term of this patent is extended or adjusted under 35 U.S.C. 154(b) by 0 days.

This patent is subject to a terminal disclaimer.

(21) Appl. No.: 14/384,531

(22) PCT Filed: Mar. 8, 2013

(86) PCT No.: PCT/AT2013/050061
§ 371 (c)(1),
(2) Date: Sep. 11, 2014

(87) PCT Pub. No.: WO2013/134806
PCT Pub. Date: Sep. 19, 2013

(65) Prior Publication Data
US 2015/0049022 A1 Feb. 19, 2015

(30) Foreign Application Priority Data
Mar. 12, 2012 (AT) .................. A 300/2012

(51) Int. Cl.
*G06F 3/0354* (2013.01)
*G06F 3/03* (2006.01)
*G06F 3/041* (2006.01)

(52) U.S. Cl.
CPC ........ *G06F 3/03545* (2013.01); *G06F 3/0312* (2013.01); *G06F 3/041* (2013.01)

(58) Field of Classification Search
CPC ............... G06F 3/03545; G06F 3/0386; G06F 2203/04101; G06F 3/03543; G06F 3/0321;
(Continued)

(56) References Cited

U.S. PATENT DOCUMENTS 4,464,652 A 8/1984 Lapson et al.
5,371,516 A 12/1994 Toyoda et al.
(Continued)

FOREIGN PATENT DOCUMENTS

| CN | 101520696 | 9/2009 |
| CN | 101751146 | 6/2010 |

(Continued)

OTHER PUBLICATIONS

International Search Report for PCT/AT2013/050061, English translation attached to original, Both completed by the European Patent Office on Jul. 19, 2013, All together 5 Pages.
(Continued)

*Primary Examiner* — Sanjiv D Patel
(74) *Attorney, Agent, or Firm* — Brooks Kushman P.C.

(57) ABSTRACT

A computer system that includes a data-processing unit, a touch-sensitive, position-resolving input surface in data communication with the data-processing unit, and a freely movable input device, by which the input surface is to be touched for the purpose of inputting into the data-processing unit. The freely movable input device is a computer mouse, which is in data communication with the data-processing unit. With comparatively low sensor complexity, inter alia, both the absolute position of the computer mouse and also subtle position changes of the computer mouse can therefore be very easily detected by the data-processing unit.

3 Claims, 1 Drawing Sheet

(58) Field of Classification Search
CPC ...... G06F 3/03542; G06F 3/038; G06F 3/041;
G06F 3/0304; G06F 3/04883; G06F
3/0416; G06F 3/0488
See application file for complete search history.

(56) References Cited

U.S. PATENT DOCUMENTS

| | | | |
|---|---|---|---|
| 5,831,597 A | 11/1998 | West et al. | |
| 6,029,214 A * | 2/2000 | Dorfman | G06F 3/03545 345/173 |
| 6,128,007 A | 10/2000 | Seybold | |
| 7,030,864 B2 * | 4/2006 | Yueh | G06F 3/0312 345/156 |
| 7,239,301 B2 * | 7/2007 | Liberty | G06F 1/3215 345/156 |
| 8,106,884 B2 * | 1/2012 | Nam | G06F 3/0321 345/158 |
| 8,405,640 B2 | 3/2013 | Ebner et al. | |
| 2002/0163511 A1 * | 11/2002 | Sekendur | G06F 3/0321 345/179 |
| 2003/0025678 A1 * | 2/2003 | Lee | G06F 3/0488 345/173 |
| 2004/0150632 A1 | 8/2004 | Clapper | |
| 2005/0057522 A1 | 3/2005 | Godler | |
| 2005/0078087 A1 * | 4/2005 | Gates | G06F 3/03543 345/163 |
| 2005/0200595 A1 | 9/2005 | Fors et al. | |
| 2005/0200597 A1 * | 9/2005 | Peng | G06F 3/03545 345/156 |
| 2006/0012562 A1 * | 1/2006 | Pope | G06F 3/0317 345/156 |
| 2008/0291165 A1 * | 11/2008 | Fe Dahlin | G06F 3/03543 345/163 |
| 2009/0040175 A1 * | 2/2009 | Xu | G06F 3/03543 345/156 |
| 2011/0167352 A1 * | 7/2011 | Ohgishi | H04N 21/422 715/733 |
| 2011/0254764 A1 * | 10/2011 | Kimoto | G02B 21/367 345/157 |
| 2011/0304545 A1 | 12/2011 | Yao | |
| 2012/0113003 A1 | 5/2012 | Ebner | |

FOREIGN PATENT DOCUMENTS

| | | |
|---|---|---|
| DE | 9316194 | 2/1995 |
| DE | 19846762 | 4/2000 |
| DE | 10110744 | 9/2002 |
| GB | 2266038 | 10/1993 |
| KR | 100859010 | 9/2008 |
| KR | 20100050896 | 5/2010 |
| WO | 9939304 | 8/1999 |
| WO | 2005096217 | 10/2005 |
| WO | 2007046604 | 4/2007 |
| WO | 2010006348 | 1/2010 |
| WO | 2010016717 | 2/2010 |
| WO | 2010118450 | 10/2010 |

OTHER PUBLICATIONS

IBM Technical Disclosure Bulletin Dec. 1991, vol. 34, No. 7A, pp. 224-226, "Force Sensing Mouse Pad".
European Communication from the Examining Division for European Application No. 13718775.3, Completed by the European Patent Office, Dated Jan. 1, 2016, 4 Pages.
Austrian Search Report for Austrian Application No. A 300/2012, Completed by the Austrian Patent Office on Feb. 25, 2013, 1 Page.

* cited by examiner

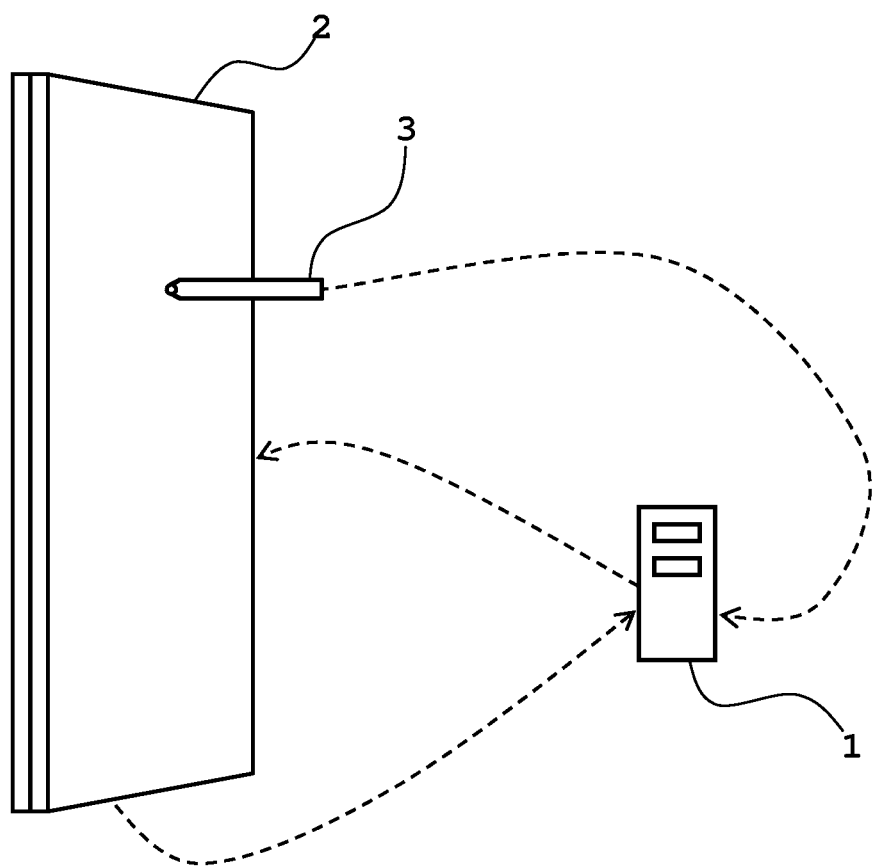

COMPUTER SYSTEM AND A CONTROL METHOD THEREFOR

CROSS-REFERENCE TO RELATED APPLICATION

This application is the U.S. national phase of PCT Application No. PCT/AT2013/050061 filed on Mar. 8, 2013, which claims priority to AT Patent Application No. A 300/2012 filed on Mar. 12, 2012, the disclosures of which are incorporated in their entirety by reference herein.

The invention relates to a computer system and to a control method therefor.

The computer system according to the invention has a data processing unit, a touch-sensitive, position-resolving input surface and a freely movable input device which can be used to touch the input surface for the purpose of input to the data processing unit.

EP 1050015 B1 describes a common principle for a so-called "optical computer mouse". The input device is moved with sliding guidance on a surface. It illuminates a small surface area of the surface, records images of the illuminated surface area and calculates the position shift which has taken place using the shift of pixels which are recorded in temporal succession and are identified as being the same. The device is well suited to measuring the relative shift of the input device on a surface from a point. If the housing is in the form of a pen, the movements which are required during handwriting can also be carried out well using said pen and handwriting can therefore already be detected during the writing operation.

U.S. Pat. No. 4,464,652 A shows a so-called "mechanical computer mouse". In this case, part of the surface of a ball which projects from a housing rolls on a surface. The rotation of the ball with respect to the housing around two axes which are normal to one another is measured and is output as information relating to the change in two coordinates.

U.S. Pat. No. 5,371,516 A implements the described principle of the "mechanical computer mouse" on a device having the form of a pen, for instance, in which case the ball is relatively small and is arranged at the tip. It is therefore possible to input the lines of handwriting or freehand sketches to a computer in a better manner than using conventional computer mice.

In the sense of this document, a computer mouse is a freely movable input device which has a data transmission connection to a data processing unit, measures a relative shift with respect to a surface along which the device is moved in two coordinates using a position change sensor and transmits the measurement data to the data processing unit. Such an "optical computer mouse" can also be in the form of a pen, as shown in CN 101751146 A, for example.

WO 2007046604 A1 shows an input device having the form of a pen, for instance. It contains a plurality of mutually independent sensor devices for measuring a position change. One sensor device is based on the principle of the "optical computer mouse" (as discussed above), and further sensor devices are inertial sensors. As a result, the input device is also functional when it is raised from a surface. A contact sensor detects whether or not the device is resting on a surface. If it is resting on the surface, the operating state "optical computer mouse" is automatically set, in which case handwriting or hand drawings can already be read in very effectively during production.

WO 2010006348 A1 and WO 2010118450 A1 show a computer system which can be controlled by means of a light-sensitive position-sensitive input surface. The input surface is a flat optical waveguide and the movable input device is a pointing device which emits a light beam. The light incident on the input surface from the pointing device causes longer-wave light in the waveguide mode as a result of luminescence, the intensity of which light decreases with the distance from the point of incidence of the causative light. Small photoelectric sensors are fitted at a plurality of points on the input surface, at which electrical signals are generated, the signal strength of which is dependent on the local intensity of the light in the waveguide mode and from which the point of incidence of the causative light is inferred. By virtue of the fact that the input surface may also be the output surface for image information output by the data processing unit, the pointing device can also effectively determine the absolute position of a processing mark (a "cursor") from a distance. Small movements of the processing mark, as occur for example when "handwriting" is effected on the input surface with the aid of the pointing device which may have the form of a pen, can be effectively detected using metrology, however, only when the input surface allows a very high position resolution. Such a high position resolution capability can only be provided with a very large amount of hardware, in particular in the case of input surfaces which are sufficiently large to also be used as an output surface of the data processing unit for presentation in front of a relatively large audience.

In the sense of this document, a touch-sensitive, position-resolving input surface is a surface which is provided with sensors in such a manner that, as soon as it is touched by an object, it provides a data processing unit with a sensor signal which states that the surface is touched and provides the position coordinates of the point of contact on the surface. The data processing unit usually uses the position coordinates communicated to the data processing unit to calculate the coordinates of a processing mark (usually referred to as a "cursor") on a display surface controlled by the data processing unit and to accordingly position the processing mark on the display surface.

There are a wealth of proposals and fully developed techniques for implementing touch-sensitive, position-resolving input surfaces. There are likewise a wealth of proposals and fully developed techniques for replacing a computer mouse with the combination of a touch-sensitive, position-resolving input surface and a pen. Instead of generating position change data by moving a mouse on a surface and reading said data into a data processing unit, the coordinates of the point of contact between the pen (or else a finger) and the input surface are measured and are read into the data processing unit. Examples of this are shown in the documents DE 10110744 A1, U.S. Pat. No. 6,128,007 A, DE 9316194 U1, GB 2266038 A, U.S. 2004150632 A1, WO 2005096217 A1, KR 100859010 B1 and CN101520696 A. CN 101520696 A shows a pen-like input device for such a position-sensitive input surface, this input device additionally having buttons, as are also typically provided in conventional computer mice ("right click"; "left click"). In contrast to the computer mouse, the input device in CN101520696(A) does not have its own means for position detection. The position is determined only using the input surface, as during input with a pen or finger.

In comparison with a true computer mouse, the advantage is that the absolute position of a cursor can be determined immediately because it can be easily assigned to the absolute position of the point of contact between the pen or finger and the input surface according to a fixed rule.

The disadvantage is that the sensitivity to small shifts in the point of contact is limited by the position resolution capability of the input surface.

A touchscreen, that is to say a surface which, in addition to the sensor function discussed, also has the function of a display surface for a data processing unit, is often used as the touch-sensitive, position-resolving input surface. In the case of particularly large touchscreens in particular, no overly fine position resolution capability is installed for reasons of affordability. This may then result in highly disruptive restrictions, in particular when inputting handwriting or when creating fine hand drawings. The inadequate position resolution capability often results in the additional difficulty that the data processing unit cannot discern whether there are one or more points of contact on the input surface, that is to say whether one or more pens are being used to "write" or "draw", for example.

The object on which the invention is based is therefore to improve the position resolution capability during input using an input surface without having to increasingly provide the input surface with sensors for this purpose.

In order to achieve the object, it is proposed to provide a computer mouse as the freely movable device, which can be used to touch the touch-sensitive, position-resolving input surface for the purpose of input to the data processing unit, and to also read the data generated by this computer mouse into the data processing unit.

In comparison with large touchscreens, the computer mice (see further above for the definition of a "computer mouse") which are available nowadays in a cost-effective manner and have excellent, technically fully developed quality have a very good position resolution capability and are very cost-effective in comparison with other, comparably powerful position sensors.

By virtue of the fact that the input surface is touch-sensitive with position resolution, the position of an input mark can be immediately determined and detected on it without the input mark having first to be oriented in a suitable manner from a display edge, like in a computer mouse.

By virtue of the fact that the freely movable input device itself has a position change sensor with a high position resolution capability, position changes which are too fine for the position resolution capability of the sensitive input surface can also be effectively detected.

The computer mouse preferably has the form of a pen, in which case the position change sensor is arranged at a tip of the pen. The computer mouse can therefore be conveniently moved like a pen or pencil by a person using it. Hand drawings and handwriting can therefore be conveniently read into the data processing unit in an effective manner already during application to the input surface irrespective of the position resolution capability of the input surface.

The computer mouse preferably has a sensor function which is used to detect whether or not the computer mouse is resting on a surface. Virtually all computer mice commercially available nowadays have such a sensor function, which is why the exact technical embodiment need not be discussed here. If the computer mouse is placed onto the input surface, an item of information is therefore transmitted to the data processing unit both by the computer mouse and by the input surface. The information transmitted by the computer mouse states that the computer mouse has come into contact with a surface. The information transmitted by the input surface describes the coordinates of a point of contact just produced. The temporal proximity of the arrival of the two items of information in the data processing unit means that the latter can discern that precisely the transmitting computer mouse is situated at the particular point of contact. Therefore, in the case of the temporally overlapping use of a plurality of computer mice on the same data processing unit and on the same input surface, the data processing unit can distinguish and clearly identify the individual computer mice in a very effective manner.

Even if the points of contact of a plurality of computer mice on the input surface are shifted, the data processing unit can still clearly identify the individual computer mice since the input surface continuously transmits absolute position data relating to each computer mouse and the computer mice themselves continuously transmit relative position change data and since the two types of data must be correlated with one another, that is to say must describe approximately the same locations and approximately the same directions of movement at the same times.

In the most preferred embodiment, the computer mouse has an optical sensor for position changes with respect to a surface along which the computer mouse slides. (The relevant sensor principle is described, for example, in EP 1050015 B1 mentioned at the outset.) However, the principle in U.S. Pat. No. 5,371,516 A mentioned at the outset, according to which a "mechanical computer mouse" is implemented in the external form of a pen, is also thoroughly useful for this purpose, for example.

In the sense of this document and therefore also in the sense of the present inventive concept, those input surfaces which, strictly speaking, do not directly detect contact by an object but rather only detect the very close approach of an object to a point on their surface can also be considered to be touch-sensitive, position-resolving input surfaces. For example, such a "touch-sensitive" position-resolving input surface can be implemented by arranging a light curtain (that is to say a light barrier extended from the line form to the surface form) just in front of it and in a manner oriented parallel to it, which light curtain is compulsorily penetrated, that is to say interrupted, by an object when it touches the input surface.

The invention is illustrated using a sketch:

The FIGURE shows the devices of an exemplary computer system according to the invention which are essential to understanding the invention. Data connections are illustrated as dashed lines provided with a direction symbol.

The computer system illustrated in the FIGURE has a data processing unit 1, an input surface 2 in the form of a touchscreen and a computer mouse 3.

Image information generated in the data processing unit 1 is output via the input surface 2 in the form of a touchscreen. Control information for the data processing unit 1 is generated both by the input surface 2 and by the computer mouse 3 and is transmitted to the data processing unit 1.

During input to the data processing unit 1, the information transmitted to the data processing unit by the input surface 2, data relating to the absolute position of the computer mouse 3, is advantageously compared with the data transmitted by the computer mouse 3, which relate to the relative position changes of the computer mouse, at regular intervals with the aid of mathematical interpolation methods. Good interpolation methods can be effectively determined by means of testing, for example. The objective and result of this comparison is the determination of the position of the processing mark such that this position represents a good compromise between the position of the computer mouse, as measured by the input surface, and the position of the computer mouse, as measured by the computer mouse itself. If this is achieved, the processing mark is always in the vicinity of the tip of the computer mouse 3, even in the case of long, continuous input processes, and nevertheless effectively experiences small fine movements of the computer mouse.

The invention claimed is:

1. A method for operating a computer system having, a data processing unit; a touch-sensitive, position-resolving input surface which is a surface that is provided with sensors in such a manner that, as soon as it is touched by an object, it provides a sensor signal to said data processing unit which states that said surface is touched and said sensor signal contains the position coordinates of the point of contact; and multiple freely movable input devices which are used to touch the input surface for the purpose of providing input to the data processing unit, each of said multiple freely movable input devices being a computer mouse which has a data connection to the data processing unit, the method comprising the steps of:

measuring with said touch-sensitive, position-resolving input surface the absolute position of points of contact on said touch-sensitive, position-resolving input surface and transmitting this absolute position information to said data processing unit;

and simultaneously measuring with each of said multiple freely movable input devices the relative position changes of said freely movable input device in that a relative shift with respect to a surface along which said freely movable input device is moved is measured in two coordinates and transmitting this relative position information of each of said multiple freely movable input devices to said data processing unit; and comparing said absolute position information of each point of contact on said touch-sensitive, position-resolving input surface and said relative position information of each of said freely movable input devices with said data processing unit to identify which absolute position information of a point of contact correlates with the relative movement data of which freely movable input device thus identifying, which freely movable input device is located on which point of contact detected by said touch-sensitive, position-resolving input surface.

2. The method as claimed in claim 1, wherein the touch-sensitive, position-resolving input surface is a touch screen.

3. The method as claimed in claim 1, wherein each freely movable input device has a sensor function which can be used to detect whether or not the freely movable input device is resting on a surface.

\* \* \* \* \*